United States Patent [19]

Belding

[11] Patent Number: 5,212,131
[45] Date of Patent: May 18, 1993

[54] LOW PRESSURE DROP FILTER

[75] Inventor: William A. Belding, Danville, Calif.

[73] Assignee: Innovative Research Enterprises, Danville, Calif.

[21] Appl. No.: 658,248

[22] Filed: Feb. 20, 1991

[51] Int. Cl.$^5$ .................. B01J 20/00; B01J 20/30
[52] U.S. Cl. .................... 502/60; 502/401; 502/411; 502/413; 502/414; 55/524
[58] Field of Search ............ 502/401, 411, 413, 414, 502/60; 423/210; 55/528, DIG. 5, 524, 527

[56] References Cited

U.S. PATENT DOCUMENTS

| Re. 31,849 | 3/1985 | Klein | 55/524 |
|---|---|---|---|
| 3,049,399 | 8/1962 | Gamson et al. | 21/53 |
| 3,822,531 | 7/1974 | Wisnewski et al. | 55/315 |
| 3,925,050 | 12/1975 | Kushihashi et al. | 423/210 |
| 3,927,165 | 12/1975 | Grochol et al. | 55/524 |
| 3,972,694 | 8/1976 | Head | 55/97 |
| 4,003,979 | 1/1977 | Kanno | 423/239 |
| 4,155,358 | 5/1979 | McAllister | 128/146.6 |
| 4,383,956 | 5/1983 | Croft et al. | 264/49 |
| 4,495,030 | 1/1985 | Giglia | 55/528 |
| 4,534,775 | 8/1985 | Frazier | 55/74 |
| 4,540,625 | 9/1985 | Sherwood | 428/283 |
| 4,550,098 | 10/1985 | Gens | 502/324 |
| 4,639,259 | 1/1987 | Pearson et al. | 55/71 |
| 4,761,323 | 8/1988 | Muhlratzer et al. | 428/198 |
| 4,793,837 | 12/1988 | Pontius | 55/316 |
| 4,797,318 | 1/1989 | Brooker et al. | 428/283 |
| 4,865,630 | 9/1989 | Abe | 55/158 |

FOREIGN PATENT DOCUMENTS

| 2810937 | 9/1979 | Fed. Rep. of Germany | 55/527 |
|---|---|---|---|
| 833287 | 5/1981 | U.S.S.R. | 423/210 |
| 2016432 | 9/1979 | United Kingdom | 55/524 |

Primary Examiner—Carl F. Dees
Attorney, Agent, or Firm—Willian Brinks Olds Hofer Gilson & Lione

[57] ABSTRACT

A filter for removing contaminants from a gas contains a support material and, deposited on the support material, a first component which is an oxide, a hydroxide or a mixture of an oxide and hydroxide of Al, Si, Ti, Fe or Zn, containing at least about 0.5% by weight of water. The first component is deposited onto the filter preferably from a colloidal sol solution of a compound of the metal of that component. The first component acts as an adsorbent to remove contaminants from a gas, such as air. The filter may contain a second component, such as an alkali metal, alkaline earth metal, permanganate(s), or a mixture thereof. The filter may also contain a third component, such as an adsorbent, in the form of separate particles, e.g., activated charcoal, potassium permanganate, activated alumina, optionally treated with an alkali metal or alkaline earth metal compound(s), zeolites, and alumino-silicate compositions. The filter is preferably used to remove contaminants from the air in central forced air systems in residential and commercial construction.

27 Claims, No Drawings

LOW PRESSURE DROP FILTER

BACKGROUND OF THE INVENTION

1. Field of the Invention

The invention is directed to a low pressure drop filter for removing contaminants from gases, such as air, to a method of manufacturing the filter, and to a process of using the filter to remove contaminants from gases.

2. Discussion of Related Art and Objectives of the Invention

Indoor air pollution has become a serious and widely publicized issue of concern. Indoor air pollution has been linked to various health problems. For example, health problems have been associated with increased levels of formaldehyde emitted by the building materials, with carbon monoxide (CO) and sulfur gases, such as $H_2S$, $SO_2$, and with mercaptans produced by natural gas combustion and cigarette smoke. In addition, air used for combustion in heating systems can contain chloride gases. With the currently-used high efficiency furnaces, outlet temperatures of such furnaces can be sufficiently low to cause condensation resulting in the formation of liquid phase hydrochloric acid (HCl) which is highly corrosive to metal furnaces and duct materials. It is, therefore, important to remove the chloride gases and mist containing such gases from the air.

Certain adsorbent materials have been used in the past for removing and/or oxidizing contaminants in air. For example, Gamson et al., U.S. Pat. No. 3,049,399, disclose the use of permanganates, such as permanganates of magnesium (Mg), sodium (Na), calcium (Ca), barium (Ba), potassium (K), and lithium (Li), to adsorb and oxidize odors from air. The permanganates are supported on a granular adsorbent, such as alumina. Such materials have also been supported on a variety of other supports, including alumina, silica, alumino-silicate, bauxite, and clay.

Muhlratzer et al., U.S. Pat. No. 4,761,323, disclose a filter, particularly a soot filter, comprising a fiber bat manufactured by impregnating or wetting the fibers with a colloidal sol, the excess of which is drawn off and the fiber material dried and sintered at a high temperature (e.g., about 900° C.). The sintered fiber bats may be subsequently treated, e.g., by coating the bats with a catalytically active material. The resulting ceramic structure is preferably used as a filter for an exhaust gas from internal combustion engines.

Brooker et al., U.S. Pat. No. 4,797,318, disclose a non-dusting, non-woven material comprising a web of meltdown fibers of an organic adhesive polymer containing adsorbent particles of activated carbon, potassium permanganate, baking soda, clays, diatomaceous earth, and activated alumina, as well as potassium permanganate complexes. The adsorbent particles are incorporated into the stream of meltdown fibers while the fibers are still tacky. The material can be used for gas/vapor filtering and/or adsorbing, specifically for disposable vacuum cleaner bags.

Pearson et al, U.S. No. 4,639,259, disclose the use of alkaline earth compounds supported on activated alumina for removing chlorides from industrial gas streams, such as reformer gas (containing principally hydrogen), and other refinery gas streams.

Kanno, U.S. Pat. No. 4,003,979, discloses a method of cleaning air containing carbon monoxide (CO) comprising removing from the air materials capable of reducing at ambient temperature the oxidization activity of a noble metal catalyst, and, subsequently, passing the air at ambient temperature through a catalyst layer composed of the noble metal catalyst supported by active carbon. The catalyst layer contains 20 to 50% by weight of water, based on the total weight of the noble metal catalyst and the active carbon. The active carbon particles containing the noble metal catalyst can be adhered onto a honeycomb-like structure by applying a conventional adhesive on the honeycomb-like structure and then depositing the active carbon particles thereon.

McAllister, U.S. Pat. No. 4,155,358, discloses a disposable valveless chemical cartridge respirator for filtration of a vinyl chloride monomer from air comprising an activated alumina coated with a color enhancing coat of manganese dioxide and with potassium permanganate. The potassium permanganate is used to indicate the end of the useful life of the cartridge.

Gens, U.S. Pat. No. 4,550,098, discloses methods for purification of mixed gas streams, containing hydrogen sulfide, carbon dioxide, carbon monoxide, sulfur, hydrogen, methane, and other hydrocarbon gases, with an oxidizing reactive solid. The oxidizing reactive solid has a general formula D-M-O, wherein D is chosen from the alkali metals or alkaline earth metals, such as sodium, potassium, lithium, calcium or magnesium; M represents a transition metal selected from the group comprising manganese, copper and iron, and Groups IB, VB, VIB, VIIB or VIII from the Periodic Table of Elements; and O designates oxygen. Optionally, the reactive solid may contain alumina, e.g., Example II.

Wisnewski et al., U.S. Pat. No. 3,822,531, disclose an automobile exhaust gas filter made, for example, of fiberglass, stainless steel wire, or asbestos. When the filter is made of fiberglass, a binder is preferably affixed to the fiberglass to ensure its thermal stability at high temperatures. Preferred binders are colloidal silicas, such as "Positive Sol 130 M and Ludox HS-40."

Activated alumina has wide use in hydrogen fluoride (HF) alkylation operations, where HF and organic fluorides carried over from the alkylation operation are scavenged from the gas stream by the alumina. In use, granular, or differently shaped forms of, alumina (i.e., spheres or extrudites) is packed into a bed and the gas to be cleaned is exposed to the bed of material.

It has also been proposed to use particles of alumina comprising a salt of permanganic acid to remove contaminants from other gases. In one example of this technology, air is forced through a filter comprising a packed bed of granular or spherical material for oxidizing the impurities from a building air. Such a packed bed of material can add a very significant airflow resistance potentially overloading or reducing the efficiency of the blower system used to circulate the air. If an existing air handling system is used, much of the air must be bypassed around the filter to alleviate the pressure drop attributed to the filter. This results in an incomplete exposure of the air to the adsorbent or oxidant. If complete exposure is desired, larger blowers are often required to overcome pressure drop. Although such a solution may be practical in certain industrial or commercial applications, it is prohibitively expensive in the residential and light commercial market segment.

Low pressure drop fiber filters have been widely used in residential and commercial heating/air conditioning applications as a means of removing airborne dust particles. However, no suitable method has been developed to make the aforementioned adsorbents, such as silica or alumina, in fibrous forms for filters to achieve low airflow resistance.

Accordingly, it is a primary objective of this invention to provide a low pressure drop filter comprising an adsorbent coating, such as silica or alumina, for removing contaminants from a gas, such as air.

SUMMARY OF THE INVENTION

One embodiment of the invention is directed to a filter for removing contaminants from a gas, such as air, comprising a support material, and, deposited on the support material, a coating comprising a first component which is an oxide, a hydroxide or a mixture of an oxide and a hydroxide of aluminum (Al), silicon (Si), titanium (Ti), iron (Fe) or zinc (Zn), or a mixture thereof, the oxide, the hydroxide or the mixture of the oxide and the hydroxide comprising at least about 0.5% by weight (wt.) of water. The support material is preferably a fibrous support material. The filter, when it comprises approximately one (1) inch thick support material, exhibits pressure drop across its surface to the flow of air at 300 feet/minute (ft./min.) of linear face velocity of about 0.05 to about 0.50 inches of water.

The filter may additionally comprise a second component which is an alkali metal, an alkaline earth metal, a compound of the alkali metal or a compound of the alkaline earth metal, a salt of permanganic acid (permanganate) or a mixture thereof. The alkali metal, alkaline earth metal and compounds thereof are particularly useful for enhanced removal of acid halide gases, such as hydrochloric and hydrofluoric gases. Salts of permanganic acid are particularly effective for oxidation of gases, such as carbon monoxide, hydrogen sulfide, formaldehyde ethyl, methyl mercaptans and other oxidizable compounds, for example, those found in cigarette smoke.

The filter may also comprise a third component comprising an adsorbent in the form of separate particles having granular, spherical or other suitable shapes. Suitable adsorbents used as the third component are activated charcoal, separately prepared salts of permanganic acid on a support distinct and separate from the support material of the filter, alumina, optionally treated with an alkali metal, an alkaline earth metal, mixtures thereof or a compound of an alkali metal, a compound of an alkaline earth metal or a mixture of such compounds, natural or synthetic zeolites or other alumino-silicate compositions, such as clay or bauxite compounds. Mixtures of such adsorbents may also be used.

In another embodiment of the invention, there is disclosed a method of producing the filter of the invention. The method comprises depositing on the support material a compound of a first metal which is Al, Si, Ti, Fe, Zn or a mixture thereof. Subsequently, a first heat treatment is conducted, which comprises heating the support material at such conditions that the compound of the first metal is converted to the first component which is the oxide, the hydroxide, or the mixture of the oxide and hydroxide of the first metal. The resulting oxide, hydroxide or the mixture of oxide and hydroxide of the first metal comprises at least about 0.5% by weight of water.

The method may also be used to deposit onto the support material the second component which is an alkali metal, an alkaline earth metal, compound(s) of the alkali or alkaline earth metal, a salt of permanganic acid or a mixture thereof. The support material is preferably contacted with the second component after the first heat treatment. Subsequently, the support material is subjected to a second, relatively mild heat treatment to remove the anion, if any, of the alkali metal, alkaline earth metal, compound(s) thereof, the salt of permanganic acid or a mixture thereof.

The method may also be used to deposit a third component onto the support material. The third component comprises an adsorbent in the form of separate particles having granular, spherical or other suitable shape. Suitable adsorbents used as the third component are activated charcoal, separately prepared salts of permanganic acid on a support distinct and separate from the support material of the filter, alumina, optionally treated with an alkali metal, an alkaline earth metal, mixtures thereof or a compound of an alkali metal, a compound of an alkaline earth metal or a mixture of such compounds, natural or synthetic zeolites, or other alumino-silicate compositions, such as clay or bauxite compounds. Mixtures of such adsorbents may also be used. The third component is deposited onto the support material before, simultaneously with or after the first component is deposited onto the support material.

Another embodiment of the invention is directed to a process of removing contaminants from a gas, such as air, comprising passing the gas into contact with the filter of this invention.

DETAILED DESCRIPTION OF EMBODIMENTS OF THE INVENTION

The support material is any fibrous filter medium, such as fiber medium comprised of glass fibers, hog hair or other animal fibers, other synthetic fibers, such as polyester, mineral wool or ceramic fibers, such as alumina. Preferably, the support material is confined within a relatively rigid frame made of any suitable material, such as plastic, metal, e.g., aluminum, or reinforced cardboard. In one preferred embodiment, the support material is confined within a relatively rigid frame to form a disposable filter, such as for example, a disposable fiberglass filter element used in central forced air heating and air conditioning systems. It will be apparent to those skilled in the art that the support material may be confined within the frame prior to, during or after the operative steps of the method of forming the filter of this invention are completed. In one preferred embodiment of this invention, the support material is confined within the frame before the method of forming the filter of this invention is carried out. Subsequently, the operative steps of the method of this invention are conducted to form the filter of the invention.

The first component is preferably deposited onto the support material by forming a colloidal dispersion (sol), preferably a stable colloidal dispersion, of a suitable compound or a mixture of compounds of the first metal (i.e., Al, Si, Ti, Fe, Zn or a mixture thereof), contacting the support material with the sol, and heating the support material, in a first heat treatment step, preferably in an oxygen-containing atmosphere, such as air or air and water vapor, at such conditions that the compound of the first metal is converted to the oxide, the hydroxide, or a mixture of the oxide and hydroxide of the metal. The resulting oxide, hydroxide or the mixture of oxide and hydroxide must contain at least about 0.5% by wt. of water.

The term "colloidal dispersion ("sol")" means a dispersion comprising a suitable dispersion medium, such as gas or liquid, and a colloidal substance, which is the disperse phase, which is distributed throughout the dispersion medium. The colloidal substance in the sol preferably has particle diameter of less than 1 micromillimeter ($\mu$m).

The term "stable colloidal dispersion", also referred to herein as "stable sol", as used herein, means a sol having a disperse phase in the particle size of about 1 $\mu$m, which is stable, i.e., the disperse phase of the dispersion does not flocculate or prematurely gel, for a period of at least about 5 minutes. The stable sol is prepared in any known manner, for example, by dispersing a compound of the first metal in a suitable dispersion medium. Certain $SiO_2$ stable sols are available commercially. Many sols, however, are not sufficiently stable and have shelf lives too short to be offered as stable sols. In these cases, stable sols can be prepared on the user's site from commercially available powders. Such powders form stable sols when they are dispersed in a disperse phase to form an acidic dispersion. Stable sols are usually obtained at a pH of about 5.5 or less, preferably about 4.0 or less, and more preferably at about 3.5 to about 3.6. For example, commercially available alumina powders, such as Versal 900 Alumina, manufactured by LaRoche Chemicals Co., or Catapal, produced by Vista Chemical Company, may be made into a stable colloidal dispersion by dispersing them in a strong aqueous, monovalent acid solution, such as that of hydrochloric acid ($HCl$), nitric acid ($HNO_3$) or formic acid ($HCO_2H$), until a stable sol is formed at a pH of about 5.5 or less, preferably about 4.0 or less, and more preferably at about 3.5 to about 3.6. Similarly, sols of titania can be produced in an acidic water dispersion from titanium oxychloride, an intermediate of the chloride process for producing pigment grade $TiO_2$. Iron oxide or hydroxide sols can be prepared by aging aqueous acidic salt solutions of iron.

It is preferred to contact the support material with a stable sol of the compound of the first metal because it is believed that such stable sols promote a stronger bond between the compound of the first metal and the support material.

The most preferred sols in one embodiment of the invention are silica and alumina sols in water, used as a dispersion medium. The concentration of the compound of the first metal in a sol is generally 1–20% and preferably 5–10%, depending on the size of the colloidal particles.

Since a sol of the compound of the first metal is the most preferred dispersion used to deposit the first component onto the support material, it will be used in the following detailed description of the invention. However, it will be apparent to those skilled in the art, that the compound of the metal of the first component may be used in any form in order to deposit it onto the support material, so long as after the first heat treatment the first component is formed on the support material. Accordingly, the use of a sol of such a compound in the following description is utilized for purposes of illustration only and is not intended to limit the invention to the use of the sol in the method of preparation of the filter of this invention.

The colloidal sols preferably used in the invention to deposit the compound of the metal of the first component onto the support material are porous after the first heat treatment, make good adsorbent coatings on the support material, and at the same time increase surface area of the support material. Adhesion of the coating is accomplished without the use of organic binders, commonly required in prior art, which tended to decrease the surface area, and therefore tended to decrease the ability of the filter to adsorb contaminants from a gas. Additionally, the colloidal sols used herein are also excellent binders for adhering other materials, in the form of separate particles, to the support material. For example, particles of adsorbents or supported oxidizing materials, such as salts of permanganic acids, may also be deposited onto the support material without the use of an additional organic binder which may clog the pores of the support material, thereby decreasing the effective surface area thereof.

The compound of the first metal, i.e., Al, Si, Ti, Fe, Zn, or a mixture thereof, or a mixture of the compounds of the metal, is deposited onto the support material by any suitable means, such as dipping the support material in the sol or by spraying the sol onto the support material. This results in the deposition of a coating of the compound(s) on the support material having a thickness which depends, to a large extent, on the viscosity of the sol. The sol forms a webbing at the fiber-fiber contact points of the support material. The amount of the webbing can also be controlled by the viscosity of the sol. Additionally, excess sol on the fibers (of the support material), especially at the fiber-fiber contact points can be reduced by blowing a gas, such as air, through the matrix of the support material.

The term "deposited", as used herein, means that a component of the filter is deposited substantially on the surface of the support material and is adhered to the support material by means of the adhesive forces provided by the sol. The support material, or its fiber, need not be softened to enable the component to adhere to the support material. This is to be distinguished from incorporating a material into the fibers of an organic adhesive polymer while the fibers of such an adhesive polymer are still tacky. The latter method is disclosed, for example, by Brooker et al., U.S. Pat. No. 4,797,318.

After the gas is blown across the support material to remove the excess sol, the support material is subjected to the first heat treatment in a suitable atmosphere, such as air, air and water vapor, or in a reducing atmosphere, e.g., hydrogen or carbon dioxide. It is preferred, however, to conduct the first heat treatment in an air atmosphere. The first heat treatment is conducted at such conditions, e.g., temperature, that the support material comprises a porous coating of the first component. The temperature of the first heat treatment should not exceed the temperature limitation of the support material and should be low enough to avoid densification and/or surface area loss of the support material.

The first component is the oxide, the hydroxide or the mixture of the oxide and hydroxide of Al, Si, Ti, Fe, Zn or of a mixture of such metals. The oxide, the hydroxide or the mixture of the oxide and hydroxide comprises at least about 0.5% by weight of water. It is preferred that the oxide, hydroxide or the mixture of oxide and hydroxide deposited on the support material contain that amount of water because a hydroxylated surface tends to aid adsorption of certain contaminants and enhances chemical reactions which occur on the adsorbent surface. The first heat treatment is conducted at a temperature of about 80° to about 600° C., preferably about 100° to about 550° C. The support material comprising the first component is effective to remove acid halide gases, such as HCl and HF, from a gas, such as air.

The content of the first component on the support material is not critical, providing that it is sufficient to adsorb from a gas the particular contaminants for the removal of which the filter is used. In general, the content of the first component on the support material is about 5° to about 200%, preferably about 20° to about 100% by weight of the support material.

After the first heat treatment, the second component may also be deposited onto the support material. The second component is an alkali metal, alkaline earth metal, a salt of permanganic acid (permanganate), a mixture of any two or more of alkali and alkaline earth metals and permanganate, an alkali metal compound, an alkaline earth metal compound, a mixture of the alkali metal and alkaline earth metal compounds, or a mixture of any two or more of the alkali metal, alkaline earth metal, the permanganate, the alkali metal compound(s) and the alkaline earth metal compounds. The alkali metals, alkaline earth metals and compounds thereof are preferably deposited onto the support material in the form of soluble salts thereof. The salts are preferably deposited onto the support material in the form of solutions in water. It is preferred to use acetic acid salts (acetates) of the alkali metals and of the alkaline earth metals.

Permanganates are used to oxidize such contaminants in the gases as carbon monoxide (CO), sulfur dioxide ($SO_2$), hydrogen sulfide ($H_2S$), formaldehyde ethyl, methyl mercaptans and other oxidizable compounds, including those present in cigarette smoke. Suitable salts of permanganic acid are permanganates of Group IA or IIA of the Periodic Table of the Elements, published by D. I. Hamm in "Fundamental Concepts of Chemistry", Appleton-Century Crafts, NY (1969). Particular examples of suitable salts are permanganates of potassium, sodium, magnesium, calcium, barium and lithium. In one embodiment, the most preferred salt of permanganic acid is potassium permanganate. The amount of active permanganic acid groups ($MnO_4$) deposited onto the filter medium is about 0.5 to about 9%, preferably about 2.5 to about 6% by weight of the first component. The salt of permanganic acid is deposited onto the filter medium by itself, or together with the alkali metal, alkaline earth metal, or compounds thereof. If the salt of permanganic acid is used in conjunction with the alkali metal, alkaline earth metal or compounds thereof, the salt is deposited onto the filter medium before, simultaneously with or after the alkali metal, alkaline earth metal or compounds thereof are deposited onto the filter medium. However, it is preferred to deposit the salt of permanganic acid onto the filter medium after the colloidal sol of the compound of the first metal is deposited onto the filter medium and after the filter is subsequently subjected to the first heat treatment. Otherwise, the first heat treatment might adversely affect the ability of a salt of permanganic acid to oxidize and/or remove contaminants from a gas.

After the second component is deposited onto the support material, the support material is subjected to a second heat treatment. If acetate salts are used to deposit the alkali metal, alkaline earth metal or their mixtures (as the second component), the second heat treatment substantially removes the acetate salt anion. This leaves substantially the alkali metal or alkaline earth metal (in the form of an oxide or hydroxide) on the support material.

If salts other than acetates are used to deposit the alkali metal, alkaline earth metal or their mixtures, the second heat treatment takes place at a high enough temperature to decompose those salts, leaving the respective oxide or hydroxide on the surface.

The resulting support material is especially useful for enhanced removal of acid halide gases, such as HCl and HF, or other acid gases, such as $SO_2$, $SO_3$, and certain halogenated hydrocarbons, from a gas, such as air. The content of the alkali and/or alkaline earth metals on the support material is about 0.5 to about 50%, preferably about 3 to about 20% by weight. The second heat treatment is conducted at a temperature of about 150° C. to about 500° C., depending on the decomposition temperature of the salts employed.

Suitable alkali metals used herein are lithium, sodium, potassium, rubidium, cesium or mixtures thereof. Suitable alkaline earth metals used herein are barium, magnesium, calcium, strontium or mixtures thereof. Compounds of any of these alkali metals or alkaline earth metals, or mixtures of such compounds, may also be deposited onto the filter. The deposition of the alkali metals, alkaline earth metals, mixtures thereof, compounds thereof or any mixtures of the compounds and/or the metals is preferably carried out by dipping the filter into a solution comprising the desired metal or compound of the metal, or by spraying such a solution onto the support material. The concentration of the alkali metal, alkaline earth metal or compounds thereof in such a solution is also not critical, so long as it is sufficient to deposit the required amount of the alkali metal, alkaline earth metal or a compound thereof onto the support material.

The support material may also comprise a third component which is an adsorbent in the form of separate particles having granular, spherical or other suitable shape. Suitable adsorbents which can be deposited onto the support material as the third component are, for example: activated charcoal (used for a more efficient removal from a gas of certain organic compounds, such as benzene, toluene, naphtha, ozone and compounds present in cigarette smoke, body odors, smog and mildew); separately-prepared salts of permanganic acid, such as potassium permanganate, on a separate support which is distinct and separate from the support material of the filter (used for oxidizing some compounds, such as carbon monoxide, hydrogen sulfide, formaldehyde and mercaptans); activated alumina, optionally treated with alkali metal compounds, alkaline earth metal compounds or mixtures of such compounds (used for removal of halide-containing impurities); natural or synthetic zeolites capable of selectively removing from a gas one or more contaminants, such as ammonia, $H_2S$ and mercaptans; other alumino-silicate compositions, such as clay or bauxite compounds (used for removing compounds, such as oils, paraffins, and halogenated compounds).

Such adsorbents may be deposited onto the support material by any suitable means. For example, the third component may be deposited onto the support material before, simultaneously with or after the first component is deposited onto the support material. It is preferred to place the adsorbent of the third component onto the support material, then apply the colloidal sol of the compound of the metal of the first component to the support material, and subject the support material to the first heat treatment. Such a method ensures that the adsorbents of the third component are adhered by the colloidal sol to the support material. If it is desired to increase the surface area of the third component and increase the diffusion path for a reaction, e.g., the adsorption of contaminants by the third component, the size of the particles of the third component should be larger than the thickness of the coating provided by the colloidal sol on the support material. This effectively extends the active life of the support material of the filter.

An alternative method of adhering the third component onto the filter's support material comprises mixing the adsorbent of the third component into the colloidal sol of the compound of the first metal, and subsequently depositing the colloidal sol, in the manner discussed above, onto the filter's support material. However, in practicing this alternative method, the content of the third component in the colloidal sol must be optimized to prevent the sol from gelling prior to or during the deposition thereof onto the support material.

If it is desired to deposit the third component onto the support material after the first component, suitable means must be used to assure that the third component adheres to the support material. For example, the third component may be placed onto the support material and then a suitable adhesive agent, e.g., a sol of the compound of the first metal, may be applied to the third component. Subsequently, if necessary, the adhesive agent may be dried, e.g., by heating.

The filter (also referred to herein as a "filter element") of this invention has substantial advantages over the filter elements of prior art. The pressure drop across the filter of this invention is very low. For example, the filter of this invention having thickness of about 1 inch exhibits pressure drop to the flow of air at 300 ft./min. linear face velocity of about 0.05-about 0.50 inches of water, depending on the amount of adsorbent(s) deposited on the support material. In contrast, a one (1) inch thick bed of spherical alumina, having particle size of 5×8 mesh (U.S. Standard) exhibits pressure drop to a substantially same flow of air of about 2.2 inches of water. A conventional, prior art one (1) inch thick fiber glass filter element, without any intentionally deposited adsorbents, exhibits pressure drop to a substantially same flow of air of about 0.01 inches of water. The above data represents initial pressure drops when the filters and the bed of spherical alumina are substantially new.

While the filter of this invention effectively removes particulate contaminants from a gas, such as air, with conventional filter medium, the adsorbent coating of the first component also removes chemical contaminants, such as acids and components of cigarette smoke from the air. The use of the colloidal sol to deposit the first component onto the support material of the filter, in the preferred embodiment of the invention, does not appreciably increase the filter's resistance to the flow of gases, such as air.

Accordingly, the filter may be used in conventional forced air, central air conditioning and heating systems, such as those used in commercial and residential construction. Such a utilization of the filter is advantageous because it does not require any additional capital investment since the filter of this invention, when utilized in such a manner, would simply replace the previously-used disposable forced air systems filters. Accordingly, in the most preferred embodiment, the filter of this invention is used to remove contaminants from air in forced air commercial or residential heating and/or air conditioning systems. After the filter has been used for a sufficiently long time to inactivate the adsorbent coating of the first component, and optional second and/or third component(s), it is replaced by a new filter.

The filter of this invention may also be used in other applications, e.g., in laboratory hoods, and in industrial applications, such as in a suitable apparatus used to remove contaminants from air in an enclosure placed in an industrial environment, such as an office in an industrial plant.

The following Examples illustrate additional features of the invention. However, it will be apparent to those skilled in the art that the specific reactants and reaction conditions used in the Examples do not limit the scope of the invention.

EXAMPLE 1

(Sol preparation Procedure)

56.7 g of deionized water and 40.4 g of diluted HCl (3.51% of aqueous solution by wt.) were added to 15.0 g of Versal 900 alumina manufactured by LaRoche Chemicals to prepare a 10% by weight alumina sol (Sol A) containing 250/milliequivalents (meq) HCl/100g of $Al_2O_3$. The batch was hand blended using a glass stirring rod.

A 20 g aliquot of the Sol A was further diluted with 20 ml water to yield a sol containing 4.9% by weight of $Al_2O_3$ (Sol B).

A 10 g aliquot of the Sol B was again diluted with 10 ml water to yield a Sol C containing 3.3% by weight of $Al_2O_3$.

As the alumina was stirred into the aqueous monovalent acid solution, the agglomerated particles dispersed into very fine particles (mostly <1 micromillimeter), as evidenced by the translucent characteristic of the sol. As the Sol A (10% $Al_2O_3$) peptized over a time period of 30 minutes, it increased in viscosity from a syrupy consistency to a thicker pasty consistency. Sol B thickened from a watery consistency to a syrupy consistency over the same 30 minute period. Sol C remained watery indefinitely.

The sols exhibited thixotropic behavior as evidenced by a dramatic viscosity reduction (to a water consistency) on shaking vigorously.

EXAMPLE 2

(Filter Media Preparation)

30 mm squares were cut from two batches of filter media provided by Precisionaire, Inc. The filter medium 1 was a glass fiber filter medium with an organic bond to keep the glass fibers intact. The filter medium 2 was a hog hair filter common to the HVAC industry.

Sols A, B and C were deposited onto the media in the manner described below.

Filter media 1 and 2 were dipped briefly into the Sol preparations A, B or C. In the case of Sol A, the Sol was shaken first to reduce its viscosity prior to dipping. The filter media were then withdrawn from the sols, drained and allowed to air dry. In one set of samples, a second adsorbent, a 28×48 mesh granular activated alumina was sprinkled onto the fibers of media 1 and 2 after draining but before drying. Fiber filter media was also sprayed with the acidified sol and allowed to dry.

The coated filter samples were then heat treated for 1 hour to remove most of the formic acid ($HCO_2H$) from the original Versal 900. The filter medium 1 was heat treated at 350° C. and the future medium 2 was heat treated at about 200° C.

Individual fibers were fully coated by each sol composition. Thickness of the coating correlated with the viscosity of the sol. Thicker sols produced thicker coatings. Sols with low solids levels (3.3% $Al_2O_3$) gave the lowest viscosity and coated the glass fibers in a fairly thin, uniform layer. Sols with higher solids levels (10% $Al_2O_3$) exhibited increased webbing at the fiber contact points. Sols prepared at high acid concentrations produced shiny glass-like coatings and webs. Added granules of the second adsorbent (the activated alumina) were bonded by the colloidal sol at their contact points.

EXAMPLE 3

(Potassium Permanganate - Containing Filter)

The heat-treated coated filter specimens of Example 2 were dipped in a saturated solution (6.4 g/100 ml) of potassium permanganate ($KMnO_4$). After 5 minutes the samples were removed and allowed to air dry. The fibers of the filter retained a significant amount of potassium permanganate, as was evidenced by the deep, purple color of the fibers.

The Examples indicate that webbing can be controlled by the viscosity of the sol which, in turn, is dictated by solids level, acid concentration, and holding time, and possibly, temperature of the sol.

The Examples also illustrate that particles of a second adsorbent can be added to the fiber/sol system while the fibers are still wet and good bonding results on drying. Although the second adsorbent in this case was activated alumina, similar results can be expected for activated charcoal, supported potassium permanganate or other granular or shaped adsorbents.

It will be apparent to those skilled in the art that specific embodiments discussed above can be successfully repeated with ingredients equivalent to those generically or specifically set forth above and under variable process conditions.

It is therefore intended that the foregoing detailed description be regarded illustrative rather than limiting, and that it be understood that it is the following claims, including all equivalents, which are intended to define the scope of this invention.

I claim:

1. A filter for removing contaminants from a gas comprising a support material and, deposited on the support material:
   (i) a first component which is an oxide, a hydroxide or a mixture of an oxide an a hydroxide of Al, Si, Ti, Fe, Zn or a mixture thereof, the oxide, the hydroxide or the mixture of the oxide and the hydroxide comprising at least about 0.5% by weight of water; and,
   (ii) a second component which is an alkali metal, an alkaline earth metal, a compound of the alkali metal, a compound of the alkaline earth metal, a salt of permanganic acid, or a mixture thereof.

2. A filter of claim 1 wherein the support material is a fibrous support material.

3. A filter of claim 2 wherein the gas is air.

4. A filter of claim 3, which, when the support material has thickness of about 1 inch, exhibits pressure drop to the flow of air at 300 ft./min. of linear face velocity of about 0.05 to about 0.50 inches of water.

5. A filter of claim 1 wherein the fibrous support material comprises a glass fiber filter medium, an animal hair filter medium, synthetic fibers or ceramic fibers.

6. A filter of claim 5 wherein the animal hair filter medium comprises hog hair fibers, synthetic fibers comprise polyester fibers and ceramic fibers comprise alumina.

7. A filter of claim 1 wherein the salt of permanganic acid is a salt of an element of Group IA or Group IIA of the Periodic Table of the Elements.

8. A filter of claim 1 which additionally comprises a third component which is an adsorbent in the form of separate particles.

9. A filter of claim 8 wherein the third component comprises granular particles of alumina, granular particles of alumina treated with at least one alkali metal and/or alkaline earth metal compound, activated charcoal, alumino-silicate, clay, a molecular sieve, a zeolite, a bauxite compound, a separately prepared and separately supported salt of permanganic acid or a mixture thereof.

10. A filter of claim 1 wherein the first component is obtained by heating the support material, comprising a compound of Al, Si, Ti, Fe, Zn, or a mixture thereof, at a temperature of about 80° C. to about 600° C.

11. A filter of claim 10 wherein the support material comprising a colloidal sol of the compound of Al, Si, Ti, Fe, Zn or a mixture thereof is heated at a temperature of about 100° to about 550° C.

12. A filter of claim 1 wherein the second component is a metal which is lithium, sodium, potassium, rubidium, cesium, barium, magnesium, calcium, strontium, a mixture thereof, a compound thereof or a mixture of the metal and a compound thereof.

13. A filter of claim 12 wherein the second component is sodium permanganate, potassium permanganate, magnesium permanganate, calcium permanganate, barium permanganate or lithium permanganate.

14. A filter of claim 13 wherein the second component is potassium permanganate.

15. A method of producing a filter, comprising a support material, for removing contaminants from a gas comprising:
   (i) depositing on the support material a compound of a first metal which is Al, Si, ti, Fe, Zn, or a mixture thereof;
   (ii) subjecting the support material to a first heat treatment comprising heating the support material at such conditions that the support material, after the first heat treatment, comprises a first component which is an oxide, a hydroxide or a mixture of an oxide and hydroxide of the Al, Si, Ti, Fe, or Zn or a mixture thereof, which comprises at least about 0.5% by eight of water; and
   (iii) depositing on the support material a second component which is an alkali metal, an alkaline earth metal, a compound of the alkali metal, a compound of the alkaline earth metal, a salt of permanganic acid or a mixture thereof.

16. A method of claim 15 wherein the first heat treatment comprises heating of the support material at a temperature of about 80° to about 600° C.

17. A method of claim 16 wherein the first heat treatment comprises heating the support material at a temperature of about 100° to about 550° C.

18. A method of claim 15 wherein the first component is an oxide, a hydroxide or a mixture of an oxide and hydroxide or silicon, aluminum, titanium, iron or zinc.

19. A method of claim 15 wherein the compound of the first metal comprises a sol of silicon, aluminum, titanium, iron or zinc.

20. A method of claim 19 which comprises, prior to said step (i), the step of depositing onto the support material a third component which is an adsorbent in the form of separate particles selected form the group consisting of granular particles of alumina, granular particles of alumina treated with at least one alkali metal and/or alkaline earth metal compound, activated charcoal, alumino-silicate, clay, a natural zeolite, a synthetic zeolite, a bauxite compound, a separately prepared and separately supported salt or permanganic acid and a mixture thereof.

21. A filer of claim 5 wherein the first component is an oxide, a hydroxide, or a mixture of an oxide an a hydroxide of Al.

22. A filter of claim 5 wherein the fibrous support material comprise a glass fiber filter medium.

23. A filter of claim 14 wherein the first component is an oxide, a hydroxide, or a mixture of an oxide and a hydroxide of Al.

24. A method of claim 18 wherein the first component is an oxide, a hydroxide, or a mixture of an oxide and a hydroxide of Al.

25. A method of claim 15 wherein the support material is a fibrous support material, said fibrous support material comprising a glass fiber filter medium, an animal hair filter medium, synthetic fibers, of ceramic fibers.

26. A method of claim 25 wherein the animal hair filter medium comprises hog hair fibers, synthetic fibers comprise polyester fibers and ceramic fibers comprise alumina.

27. A method of claim 25 wherein the fibrous support material comprises a glass fiber filter medium.

* * * * *

UNITED STATES PATENT AND TRADEMARK OFFICE
CERTIFICATE OF CORRECTION

PATENT NO. : 5,212,131   Page 1 of 2
DATED      : May 18, 1993
INVENTOR(S): William A. Belding It is certified that error appears in the above-identified patent and that said Letters Patent is hereby corrected as shown below:

Column 1, Line 60, "U.S. No." should read --U.S. Pat. No.--.

Column 4, Line 48, "before" should read --after--.

Column 5, Line 29, "$(HC_1)$," should read --(HCl),--.

Column 8, Line 10, "by weight." should read --by weight of the first component.--.

Column 11, Line 48, "an" (second occurrence) should read --and--.

Column 11, Line 64, "1" should read --2--.

Column 12, Line 41, "ti," should read --Ti,--.

Column 12, Line 50, "eight" should read --weight--.

Column 12, Line 57, "of" should be omitted.

Column 12, Line 64, "or" (first occurrence) should read --of--.

Column 13, Line 4, "form" (second occurrence) should read --from--.

UNITED STATES PATENT AND TRADEMARK OFFICE
CERTIFICATE OF CORRECTION

PATENT NO. : 5,212,131
DATED : May 18, 1993
INVENTOR(S) : William A. Belding

It is certified that error appears in the above-identified patent and that said Letters Patent is hereby corrected as shown below:

Column 13, Line 13, "an" (third occurrence) should read --and--.

Column 14, Line 10, "of" should read --or--.

Signed and Sealed this

Twenty-sixth Day of April, 1994

Attest:

BRUCE LEHMAN

Attesting Officer    Commissioner of Patents and Trademarks